Inventors
Willy Lohs,
Friedrich Sommer
and Günter Thom
By
Att'y

Sept. 12, 1961 W. LOHS ET AL 2,999,904

TELEPHONE INSTALLATION BAY STRUCTURE WITH SLIDING SWITCH FRAMES

Filed Dec. 10, 1958 11 Sheets-Sheet 2

Inventors
Willy Lohs,
Friedrich Sommer
and Günter Thom
By [signature] Atty

Inventors
Willy Lohs,
Friedrich Sommer
and Günter Thom
By [signature]
att'y

Inventors
Willy Lohs,
Friedrich Sommer
and Günter Thom
By
Att'y

Inventors
Willy Lohs,
Friedrich Sommer
and Günter Thom
By [signature]
Atty.

Inventors
Willy Lohs,
Friedrich Sommer
and Günter Thom
By [signature] Att'y.

Sept. 12, 1961 W. LOHS ET AL 2,999,904
TELEPHONE INSTALLATION BAY STRUCTURE
WITH SLIDING SWITCH FRAMES
Filed Dec. 10, 1958 11 Sheets-Sheet 7

Inventors
Willy Lohs,
Friedrich Sommer
and Günter Thom
By [signature] Att'y.

Inventors.
Willy Lohs, Friedrich Sommer, & Günter Thom
By. [signature] Atty.

Sept. 12, 1961 W. LOHS ET AL 2,999,904
TELEPHONE INSTALLATION BAY STRUCTURE
WITH SLIDING SWITCH FRAMES
Filed Dec. 10, 1958 11 Sheets-Sheet 9

Inventors
Willy Lohs,
Friedrich Sommer
and Günter Thom
By [signature] Att'y

Sept. 12, 1961 W. LOHS ET AL 2,999,904

TELEPHONE INSTALLATION BAY STRUCTURE WITH SLIDING SWITCH FRAMES

Filed Dec. 10, 1958 11 Sheets-Sheet 10

Inventors
Willy Lohs,
Friedrich Sommer
and Günter Thom
By [signature] atty.

Sept. 12, 1961 W. LOHS ET AL 2,999,904

TELEPHONE INSTALLATION BAY STRUCTURE WITH SLIDING SWITCH FRAMES

Filed Dec. 10, 1958 11 Sheets-Sheet 11

Inventors.
Wilfy Lohs,
Friedrich Sommer, &
Günter Thom.
By [signature] Atty.

United States Patent Office 2,999,904

Patented Sept. 12, 1961

2,999,904

TELEPHONE INSTALLATION BAY STRUCTURE WITH SLIDING SWITCH FRAMES

Willy Lohs, Friedrich Sommer, and Günter Thom, Munich, Germany, assignors to Siemens & Halske Aktiengesellschaft Berlin and Munich, a corporation of Germany Filed Dec. 10, 1958, Ser. No. 779,456
Claims priority, application Germany Dec. 20, 1957
17 Claims. (Cl. 179—91)

This invention is concerned with a communication exchange installation and particularly a telephone exchange installation comprising a block including a plurality of bay structures for receiving switch frames in sliding engagement therewith, with service passages between the bays thus formed and a surrounding or peripheral passage delimiting the bay block.

The object of the invention is to reduce the floor space requirements as well as the length of the electrical and mechanical connections between the bays and the wiring expenditure, and further, to simplify the aggregates of the installation.

The floor space requirement of a multi bay communication installation, for example, a telephone exchange installation, is determined by the floor space of all bays and by the floor space of the surrounding or peripheral passages for gaining access to the bay units, which passages are for reasons of safety usually of a predetermined width. In addition thereto, there must be considered service passages lying between the bays, for gaining access to the service sides of the individual units, the minimum width of which is determined by the service requirements, for example, by the size of measuring instruments to be used.

A block of bays for such an installation was constructed in the past with the bays and the service passages therebetween extending perpendicular to the long sides of the peripheral passages surrounding the block. The length of the bays was thus determined by the short sides of the peripheral passage, thus requiring a considerable number of bay units for accommodating the required switching devices, disposed one in back of the other in longitudinal direction of the block formed thereby. The numerous service passages between the individual bays increased the length of the electrical and mechanical connecting parts required for the bridging of such passages. It was in addition impossible to accommodate in a single bay unit the relatively large number of switching means required for certain functions of the installation.

The construction of the installation is in accordance with the invention improved by arranging the bays in a block, in such a manner that the service passages therebetween run in the direction of the long sides of the surrounding or peripheral passage of the corresponding block.

The proposed arrangement reduces the number of bays and therewith the service passages. The electrical and mechanical connection parts between the bays are shortened. The passage surrounding the block of bays peripherally is with the same number of bays likewise shortened and the total floor space requirements of the installation are reduced. A greater number of switching means can be accommodated in each bay because the frames may be made of larger size. The length of wiring between the groups of switching means is reduced since no service passages between several bay units need be bridged; in prior arrangements, these groups of switching means had to be distributed among several bays. A further advantage of the arrangement according to the invention resides in an increase of the floor space portion occupied by bays with respect to the total floor space of the installation and therewith a better utilization of the available space. The arrangement according to the invention is particularly effective since the switching devices are disposed in sliding frames arranged in the bays with their long sides in parallel.

In the installation employing sliding frames, there are no parts disposed on the rear of the bays which have to be serviced. Therefore, a further reduction of the floor space may be effected according to the invention by disposing two bay units so that the sides thereof on which the respectively associated sliding switch frames are respectively inserted and removed are positioned in mutually facing relationship. In such arrangement, one service passage will be allotted to two bays or, considered from a different angle, one service passage between two bays can be eliminated.

In the case of bay structures with fixed switch frames, a back to back arrangement of two bays is impossible because the corresponding frames must be accessible from the front as well as from the rear. However, the use of slide frames makes back to back arrangement possible and such arrangement may according to the invention be utilized to dispose two bays, each of which accommodates a number of slide frames, serially, in such a manner that the rear sides of the oppositely positioned slide frames are in the ultimate position thereof adjacent one another except for a small space required for an intermediate bay serving for the cable connections. This results in a further saving of space.

The length of a bay that may be provided in accordance with the invention permits further reduction of the cable lengths and of the number of connection elements by distribution of the switching means with respect to the slide frames in such a manner that groups are formed of all switching means wired in the same bay unit in incoming and outgoing direction and connected with a common distributor field which is mechanically connected with the corresponding bay and formed of the distributors allotted to the slide switch frames.

The above explained arrangement considerably shortens the length of the multiple wiring of the groups of switching means. The cable connections between a plurality of bays arranged centrally in an exchange, to which these switching means groups with their terminal means were previously distributed, are thus completely eliminated.

Since the distributors are at the distributor field fixed and since the switching devices are disposed upon movable frames, it follows that the wiring must be movable. In accordance with the invention, this is achieved by connecting the switching means groups arranged in the slide frames of a bay with the distributors going to the common distributor field, by means of flat or ribbon cables which extend from the distributors to the respective slide frames in looped manner, thus permitting extension thereof upon sliding displacement of the corresponding frames.

The cables of the system which interconnect the bay units are carried by a cable grate which may in known manner be provided on top of the bay and fastened either on the ceiling of the switch room or else upon supports extending from the floor. In accordance with a further feature of the invention, the cable grates are utilized as carriers for the distributors of the distributor field by arranging the distributors allotted to the slide frames above the slide frames upon a cable grate serving for the system cable in such a manner that they are accessible at the front of the bays.

In order to permit with such arrangement of the distributors a multiple wiring between the switching devices of neighboring slide frames without unduly hampering the mobility thereof, the respective individual ribbon cables of two neighboring slide frames which extend from the switching devices of the corresponding frames, are in accordance with the invention interconnected by means of a jumper ribbon cable which is joined therewith. Such jumper ribbon cable is a length of cable folded upon itself in generally U-shaped, the legs thereof being connected to ther espective ribbon cables of the two individual slide frames and extending parallel therewith from points on the rear of the respective slide frames, thence upwardly and forwardly on top of the respective slide frame, with the base of the U (folded portion of the jumper) disposed near the upper frontal edges of the corresponding slide frames. This results in simple manner in a continuous connection extending between the individually movable slide frames without any intermediate solder points, thus also reducing the number of solder points at the distributors.

Instead of using a cable support grate, there may be provided a special carrier for the distributors. In accordance with the invention, this may be realized by arranging the distributors allotted to the slide frame upon a carrier which is fastened at the rear of the bay on the floor of the switch room. This makes a working area available which is determined by the rear side of the bay and which is in the construction of the installation according to the invention relatively very large and upon which the distributors can be mounted easier than upon a cable grate. It must also be considered that a cable grate must be placed in position prior to placing the distributor field which is structurally often unfavorable.

In the case of bays with distributors arranged on the rear side thereof there may in accordance with the invention be provided an intermediate space, forming a service passage between successive bays, such service passage giving access to the distributor fields. The distributor fields do not have parts that might have to be moved and the corresponding passage therefore may be relatively narrow, thus preserving the favorable utilization of space.

In prior telephone exchange installations, the terminal and the guide elements for the distributing and the multiple wiring have been arranged in separate bays disposed centrally between other bays. Such arrangement has the drawback of requiring auxiliary wiring from bay to bay. Such wiring becomes particularly extensive in the case of groups of switching means that must be distributed over a plurality of bays. In the construction of the installation according to the invention, groups of switching means belonging together so far as circuiting is concerned can be accommodated in a single bay since the bays can accommodate a great number of slide frames, but the expenditure with respect to the distribution wiring and the multiple wiring still is considerable. However, in installations with such bays comprising several frame units, the rear side thereof becomes available for the placement of terminal and guide elements for the wiring, insofar as the space is not occupied by connection elements for the groups of switching means carried in the movable slide frames. In accordance with the invention, this situation is utilized for eliminating the disadvantages indicated above.

This object is realized by fastening the common distributor field on carriers connected directly with the bay structure and extending along the rear side thereof and arranging on the distributor field terminal and guide elements for the distribution and the multiple wiring of the groups of switching means connected to the distributor field. Between the slide frames and the distributor field on the rear side of the bay there will result a passage upon pulling out the slide frames which facilitates the placement of parts. The plural utilization of the distributor field for the terminals of the switching means in the slide frames and for the multiple and distribution wiring also shortens the distribution wiring between the switching means carried by the various slide frames. A single field for the distribution device will suffice because, in the above explained bay structure, all groups of switching means which are by way of the distribution wiring connected to the remaining groups of switching means can be accommodated in the same bay.

The terminal and guide elements for the distribution and and multiple wiring are advantageously arranged at the distributor field between the terminal elements of the incoming and the terminal elements of the outgoing wiring. Such arrangement places the terminal connections of the distributing wiring, which may have to be changed during the life of the system, on a convenient level for handling along the rear of the bay in the central part of the distributor field. This is also advantageous in connection with alteration of the multiple wiring after the completion of the exchange installation.

In order to achieve a further shortening of the multiple wiring and to keep the spatial requirement thereof small perpendicularly to the distributor field, the terminal and guide elements for the distribution and multiple wiring are in accordance with another feature of the invention combined in separate groups, the wires for the multiple wiring extending between such groups.

In the exchange equipment according to the invention, a great number of slide frames are to be accommodated in a bay and the arrangement thereof accordingly results in difficulties. In the past, several cabinet-like structural parts were connected together, containing respectively groups of cooperating switching means which are protected by doors. It is also known to dispose the switching means in pivotally mounted frames whereby the switching means become accessible upon rotating the corresponding frames outwardly. Such bays call for relatively great expenditure, requiring a great number of differently constructed parts and moreover requiring a great number of specially constructed mounting devices for anchoring the bay structures to the floor and in part also to the ceiling of the switch room. There is also a bay construction known comprising vertically disposed frames for the switching means, which are hooked into and guided by guide means, and which can be pulled out therefrom. Slide frames of this type are only adapted for supporting relatively light weight structures such as pipes and the like, and do not simplify the construction of the corresponding bays.

In accordance with the invention, the sliding frames may be particularly advantageously constructed for placing them in the bay alongside one another in upright position, and providing them with rollers so that they can be individually pulled out of the corresponding bay unit. The sliding frames are thus identically constructed for the entire bay. The bay may in this manner be constructed in most simple manner. The sliding frames provided with rollers resting on the floor and carrying the necessary completely wired switching means, are simply positioned one next to the other without requiring any particular devices for the anchoring thereof to the floor. The accessibility of the switching devices in the slide frames is preserved by the possibility to pull the individual frames from the bay. The bay structure merely serves as a guide for the slide frames resting on rollers in engagement with the floor.

In order to secure the heavy side frames in their inserted and also in their pulled-out positions and in order to dampen shocks occurring incident to the displacement of slide frames, that may affect the switching devices and the structure of the bay, a rubber shock absorber, disposed at the floor, may be provided for each slide frame for cooperation with stops carried by the slide frame at the front and rear thereof, to limit the displacement of the corresponding slide frame. The rearwardly disposed stop may be movable to facilitate in simple manner insertion of the slide frame in the bay.

According to the invention, the slide frames arranged in the bay may be made of profiled material exceeding in the direction of the narrow side thereof the width of the switching devices carried thereby and the wiring therefor. When constructed in this manner, the slide frames can be disposed in a bay directly one next to the other. The use of narrower profile material would require provision of sheets along the sides and the top of the slide frame to permit placement thereof with the sheets adjacently relatively closely disposed so as to prevent interference therebetween and to improve the entire bay structure.

The sides of the slide frames facing to the front of the bay may be utilized for the disposal of desired signals and indicating devices (lamps and the like) belonging to signalling or control instruments allotted thereto, which may be positioned along the outwardly facing outwardly visible parts of the slide frames. This is of particular advantage in view of the relatively long service passages resulting in accordance with the invention and giving access to numerous slide frames the operating conditions of which may thus be easily observed and ascertained from the outside.

The various objects and features of the invention will appear from the following description of embodiments which will be rendered with reference to the accompanying drawings. In the drawings, FIG. 1 shows in schematic manner the floor plan of a telephone exchange installation comprising bays of customary structure with fixedly disposed switch frames;

Figure 3:
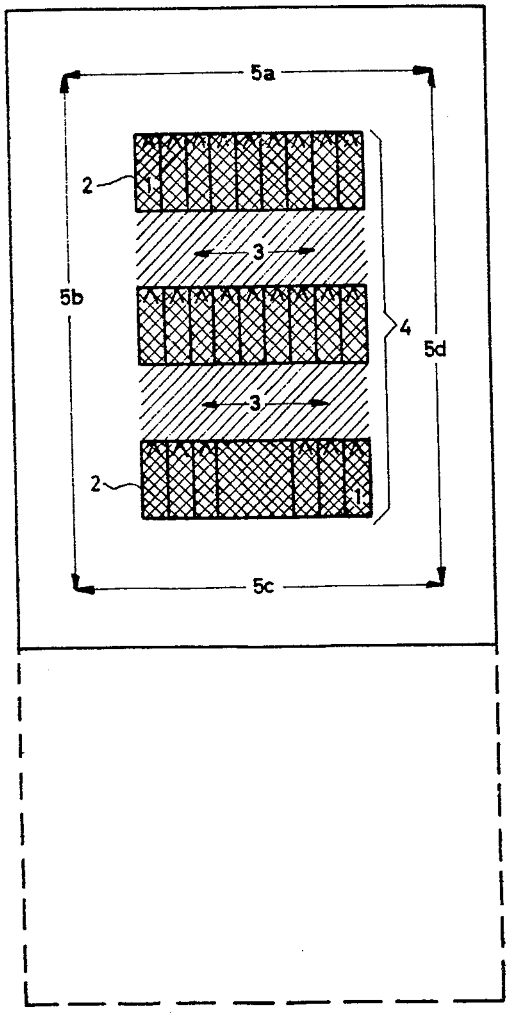
FIG. 3 illustrates an arrangement according to FIG. 1 using however sliding frames.
Figure 4:
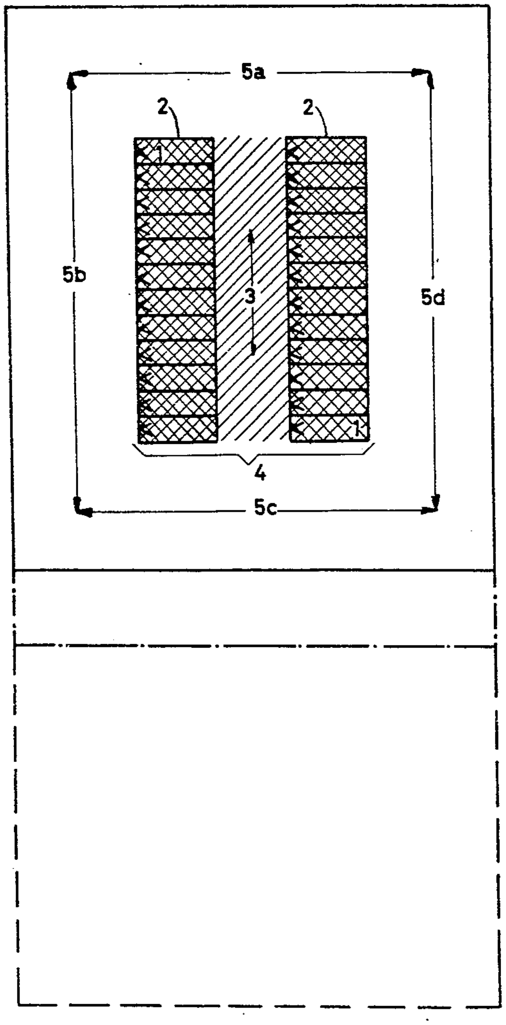
Figure 5:
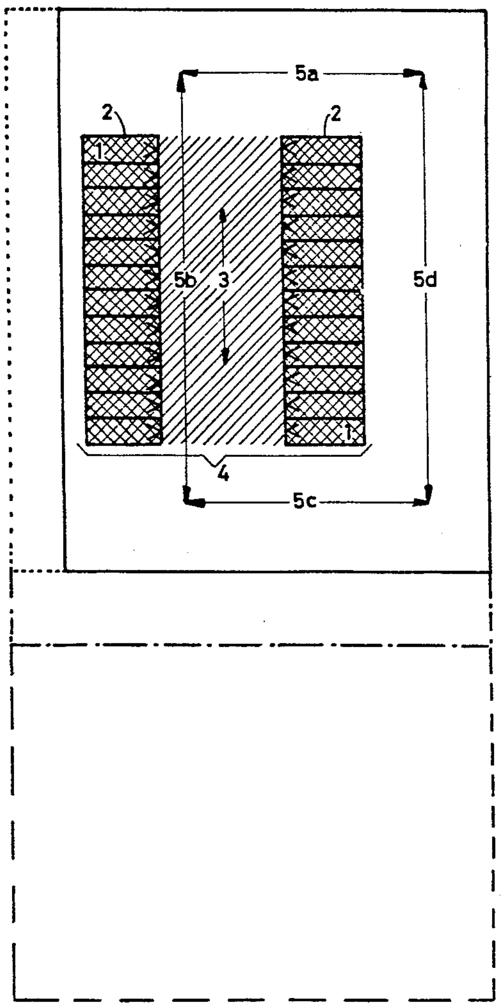
Figure 6:
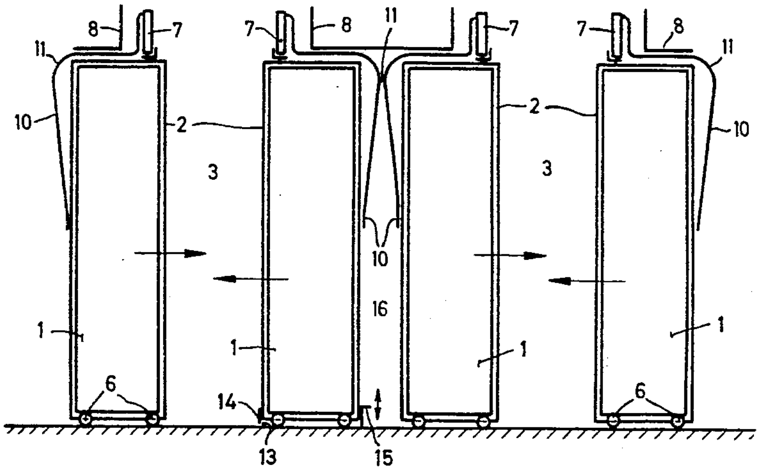
Figure 7:
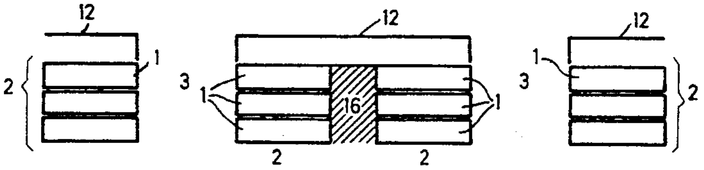
Figure 10:
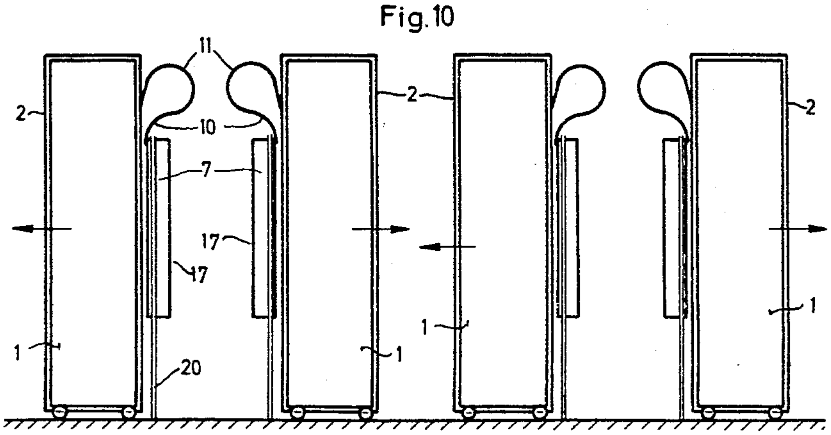
Figure 8:
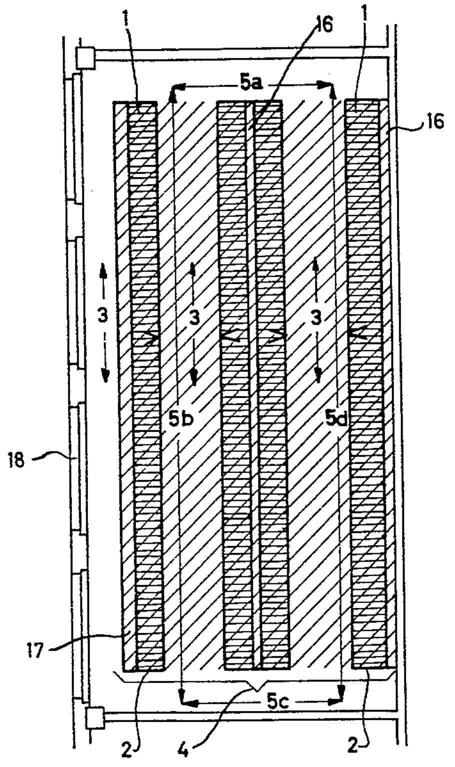
Figures 9, 14:
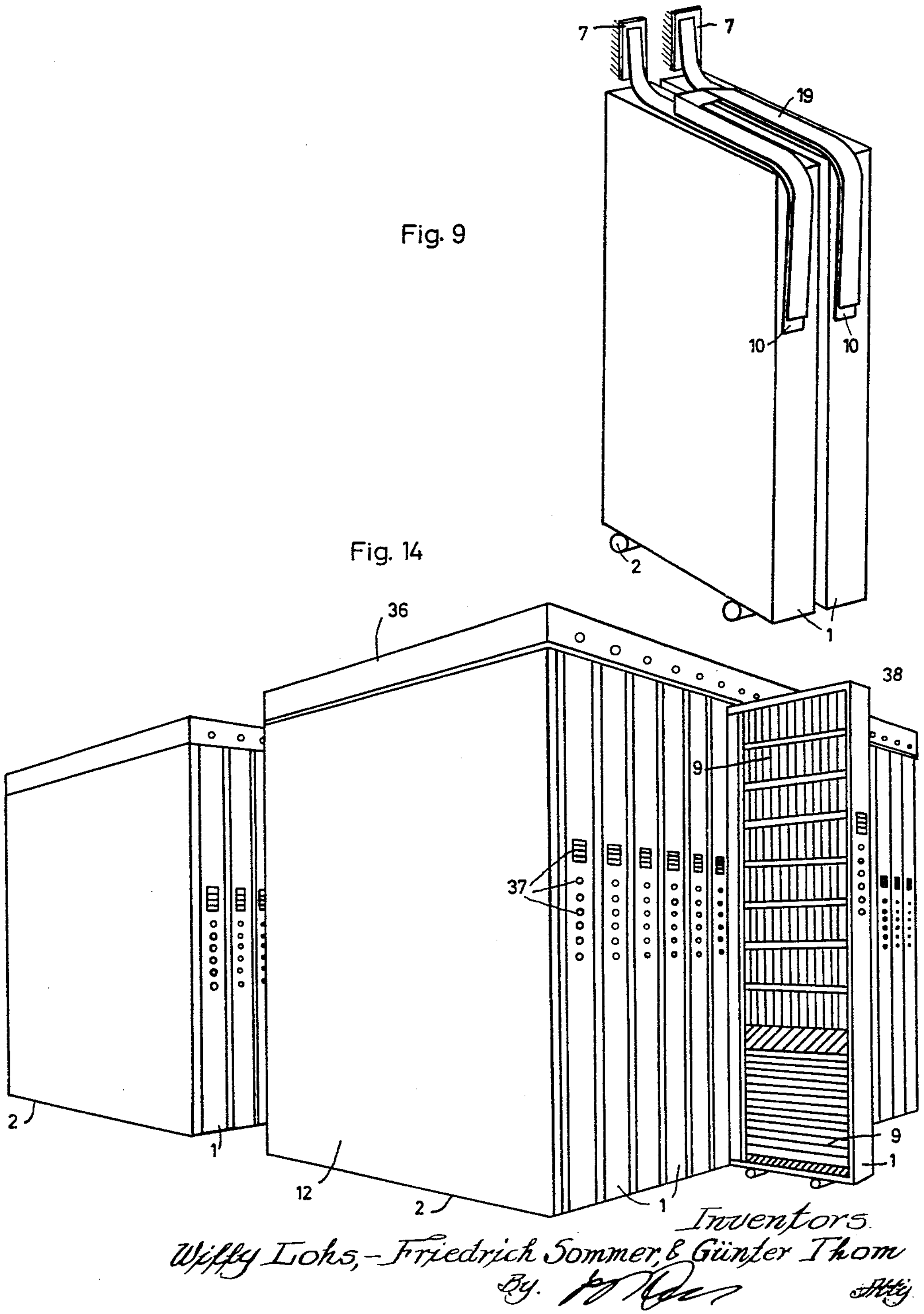
Figure 11:
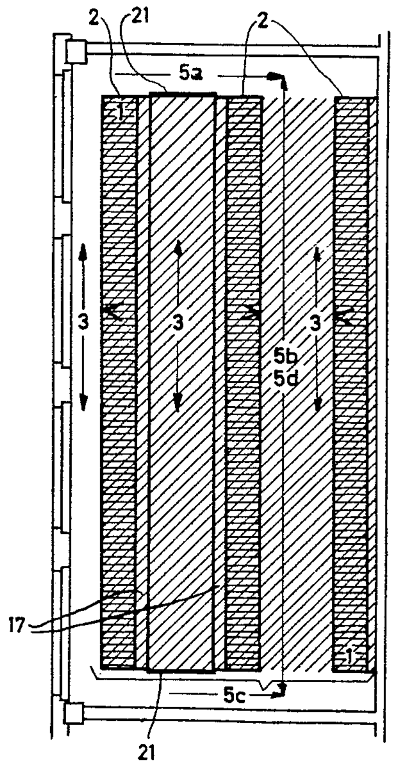
Figure 12:
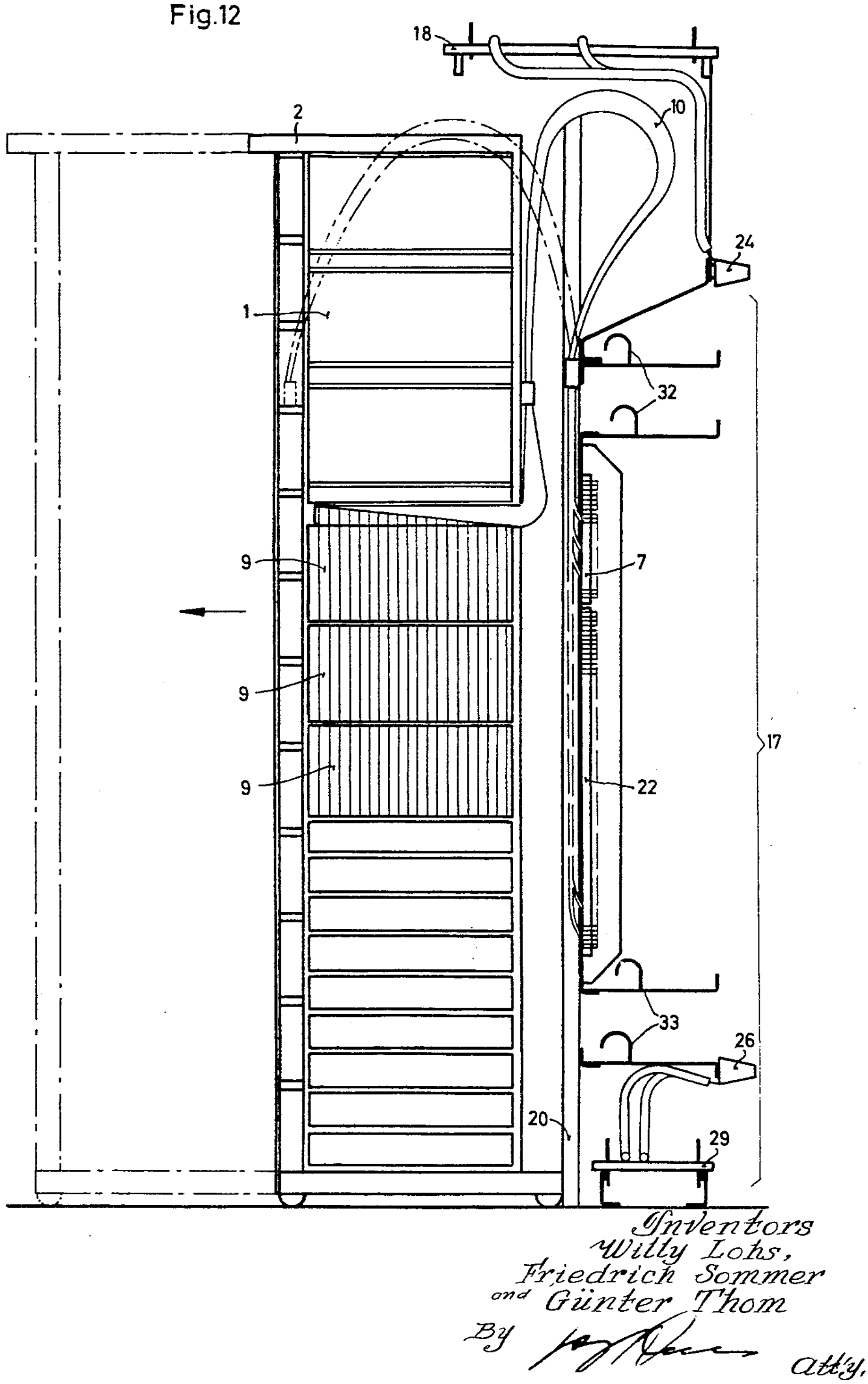
Figure 13:
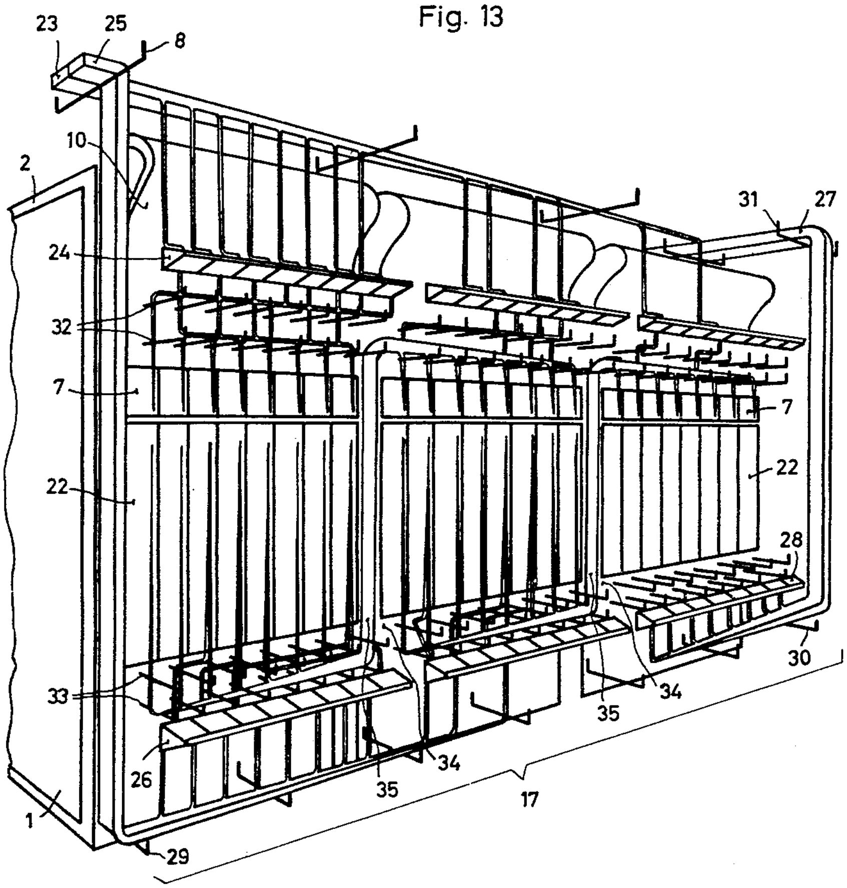

FIG. 4 indicates an arrangement comprising bays according to FIG. 3 disposed according to the invention;

FIG. 5 represents an arrangement similar to FIG. 4, in which the bays are disposed in mutually facing positions and having common service and peripheral passages;

FIG. 6 is a schematic side view of four bays according to the invention;

FIG. 7 shows a schematic ground plan of the bays according to FIG. 6;

FIG. 8 illustrates a schematic ground plan of a telephone exchange installation for 10,000 lines employing slide frames according to the invention;

FIG. 9 indicates in schematic manner two adjacent slide frames with their connecting lines;

FIG. 10 is a schematic side view of a different embodiment of four bays;

FIG. 11 shows the floor plan of a telephone exchange installation according to a modification;

FIG. 12 represents a bay with distributor field in schematic side view thereof;

FIG. 13 illustrates the distributor field according to FIG. 12; and

FIG. 14 is a schematic view of an installation with two bays according to FIG. 4.

Figure 1:
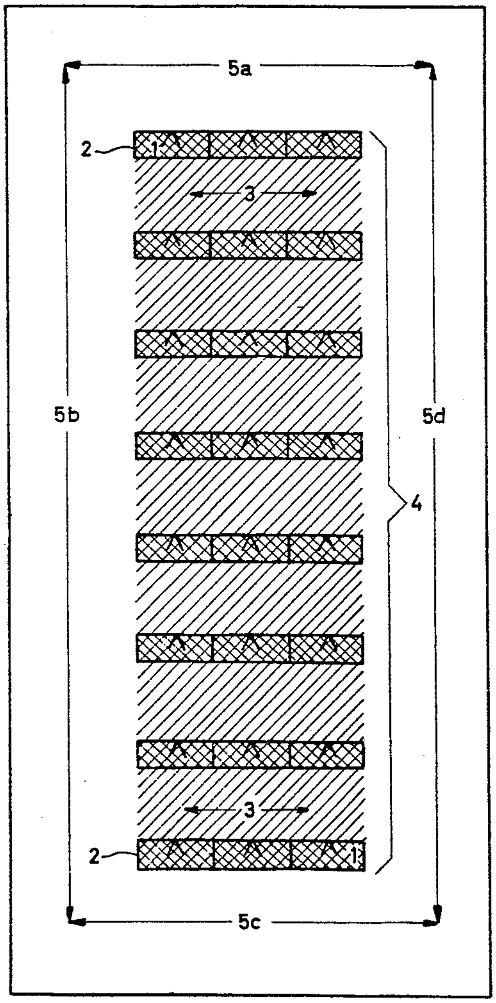
Figure 2:
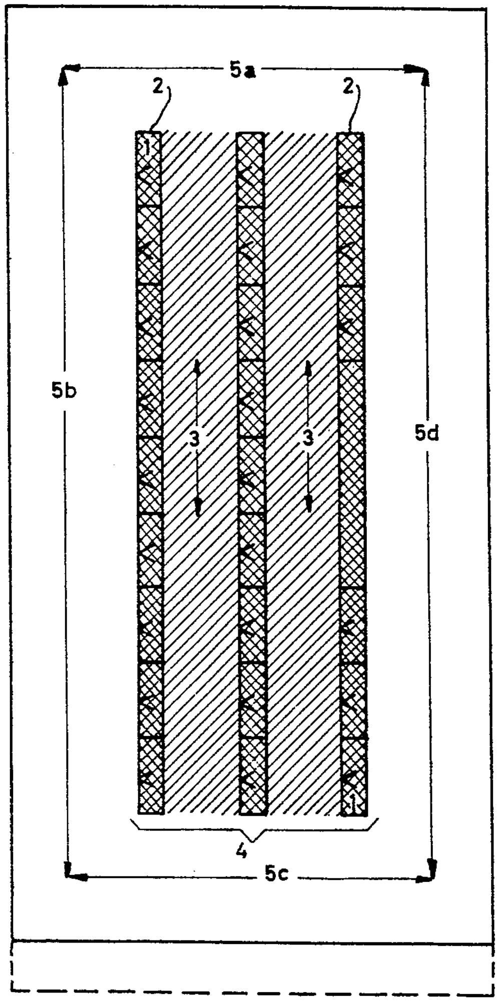
FIG. 2 represents an equivalent exchange installation with bays arranged according to the invention.

FIGS. 1 to 3 are intended for comparison with installations having bays constructed respectively in customary manner and according to the invention, provided respectively with fixedly mounted switch frames and with slide switch frames. The floor plans according to FIGS. 1 to 5 are based upon a telephone exchange installation with twenty-four frame units 1 for receiving switching devices. The frame units 1 represented in FIGS. 1 to 5 occupy respectively identical floor spaces. The frame units 1 are combined to form a plurality of bays 2. Between the bays 2 are provided service passages 3 for gaining access to the service sides of the frame units 1 which are indicated by arrow heads. The width of the service passages is in FIGS. 1 to 4 assumed to be identical, such width being respectively determined by the kind of service work to be performed as well as by the size of the work tools, the space requirements for doors that may be provided in the bays, and by the space required for pulling slide frames from a bay. The bays 2 together with the service passages 3 form in each of these FIGS. 1–5 the bay block 4.

The installation is provided with a peripheral or surrounding passage 5 giving access to the bay block 4 from several sides thereof, such passage being subdivided into sections *a*, *b*, *c*, and *d*. The sections **5*a* and 5*c* extend at the ends and the sections 5*b* and 5*d* extend alongside the installation. The width of the peripheral passage 5 is in all embodiments according to FIGS. 1 to 5 indentical and is primarily determined by prevailing safety rules, for example, by the size of fire extinguishers. The bay block 4 and the peripheral passage 5** determine the total area of the installation which is in all FIGS. 1 to 5 represented on the same scale.

The floor plan of the installation is in FIG. 1 delimited by full lines. The frame units 1 are in each bay 2 disposed fixedly in customary manner with the narrow sides thereof one adjacent to the other. Since the bays 2 extend in parallel with the narrow side of the floor space, that is, in parallel with the sections **5*a*, 5*c* of the peripheral passage, they are necessarily relatively short and can accommodate only a few frames, for example, only three frames, thus necessitating a relatively large number of bays 2 numbering in the assumed example eight bays. The switching means belonging to a switching operation must in most cases be distributed in two bays, requiring multiple connections that may have to be carried over several bays. Distributor fields must be accommodated in one or more bays. The length of the cables and cable grates (not shown) which are needed for interconnecting the bays 2 of the bay block 4 is increased by the sum of the service passages 3**.

FIG. 2 also shows a floor plan of an installation delimited by the full line extending peripherally thereof. The dotted lines extend the floor space requirements to that shown in FIG. 1. In contradistinction to FIG. 1, the bays 2 are in accordance with the invention disposed in parallel with the long sides of the installation, that is, in parallel with the sections **5*b* and 5*d* of the peripheral passage. This makes it possible to increase the length of the bays so as to accommodate in each bay nine frames. The number of bays is reduced to three bays as compared with eight bays in FIG. 1. Functionally cooperating switching means and wiring therefor can be disposed without difficulties in a single bay and bridging of service passages as in FIG. 1 is eliminated. The length of cable supporting grates and of cables extending from bay to bay (system cable) becomes relatively short since only few service passages 3 need be bridged. The length of the bays also permits to dispose the distributing means in a single bay. The entire space requirements of the installation are as compared with FIG. 1 reduced by the space amount indicated by dotted lines at the bottom of FIG. 2. The proportionate amount of space occupied by the bays 2** is greater in the arrangement according to the invention than in FIG. 1 which means, that the available floor space is in FIG. 2 more favorably utilized even without the use of sliding switch frames.

In the example shown in FIG. 3, the bays 2 are again disposed in known manner, as in FIG. 1, in parallel with the narrow peripheral passage sections **5*a* and 5*c*. However, the bays are in this embodiment equipped with sliding frames 1** which are disposed alongside one another, that is, with their long sides in abutment. This construction results in a gain of floor space amounting as compared with FIG. 1 to an area delimited by dotted lines. Previously indicated further advantages are obtained by the arrangement of the bays of FIG. 3 as shown in FIG. 4.

In FIG. 4, the frame units constructed according to FIG. 3 are arranged in bays 2 extending in parallel to the long sections **5*b* and 5*d* of the peripheral passage bordering on the bay block, forming between the bays 2 a service passage 3, which extends likewise in parallel with the long sides 5*b* and 5*d* of the peripheral passage. The full line extending about the bay block 4 delimits the total floor space area of this embodiment of the installation; the dot-dash line indicates the floor area to be added thereto according to FIG. 3; and the dotted lines added to both indicate the area required in embodiment according to FIG. 1. The arrangement of the bays 2 in the longitudinal direction results in this embodiment as compared with the bay arrangement of FIG. 2, in an increase of the capacity for each bay unit or group due to the disposal of the sliding switch frames alongside one another. In the illustrated example, twelve slide frames 1 can be accommodated in each bay 2 and all switching means for the installation are accordingly distributed over two bays 2**.

FIG. 5 shows how the two bays 2 of FIG. 4 can be arranged to effect further savings in floor space by disposing the bays so that the service sides of the corresponding sliding frames 1, designated by arrow heads, are facing each other. The bays have the service passage 3 in common. The space saving as compared with the arrangement according to FIG. 4 is partly utilized for widening the service passage 3 to the width of the section 5*d* of the peripheral passage, the two passages being in this manner complementary. The resulting change affecting the peripheral passage is made possible because the rear sides of the bays are free of switching means to be service or supervised. The floor area requirements of the installation are still smaller than those of FIG. 4 by the area delimited by dotted lines. For the sake of comparison, FIG. 5 also shows in dot-dash lines the area required according to FIG. 3 and in dash lines the area required according to FIG. 1. The proportionate share of floor area occupied by the bays is larger than in FIG. 4 and the space is accordingly utilized more favorably than in the previously described embodiments.

FIGS. 6 and 7 illustrate respectively in end view and in floor plan view parts of four bays 2 constructed according to the invention, arranged one in back of the other, and adapted to receive sliding switch frames 1. Rollers 6 are provided at the bottom of the respective sliding frames 2 for supporting the corresponding frames on the floor of the switch room. To each frame is allotted a distributor 7, fastened on top thereof on parts of the cable support grate 8 provided for carrying the system cable in such a position that the distributors are accessible from the front of the bay, that is, from the side at which the sliding frames 1 can be pulled out from the bay 2. To each distributor are connected the conductors of a line or conductor bundle, by means of a ribbon cable 10, extending to the switching means 9 (FIG. 12) arranged in the corresponding sliding frame. The ribbon cable 10 is carried to the corresponding sliding frame 1 in the form of a bulge or fold 11 and can thus follow the motion of the sliding frame upon pulling it from its inserted position in the bay. The ribbon cable responds to bending easier than round cables customarily used in the wiring of bays.

As shown in FIG. 7, the sliding frames 1 belonging to a bay 2 are arranged directly alongside one another, thus affording mutual protection for the frame parts which receive the switching means. The outwardly disposed sliding frames 1 in the bay 2 are protected by sheet means 12. The carriers for these sheet means or members are suitably anchored to the floor and are advantageously utilized to serve as carriers for the cable grates 8.

In the embodiment according to FIG. 6, there are provided bottom stops such as 13, made of rubber and the like, for limiting the displacement of the various sliding frames. One such stop is sufficient for each sliding frame 1 which carries on the front and rear thereof counter stops indicated respectively at 14 and 15. The counter stop 14 at the front of the sliding frame is fixedly connected therewith and the counter stop 15 at the rear of the frame may be movable and lifted up upon positioning the corresponding sliding frame 1 in its place. The sliding frame 1 can with such construction of the counter stop 15 be moved past the stop 13 without requiring lifting thereof. The manner of limiting the motion results in the advantage of preventing transmission of forces to the cable supporting grate 8 and to the neighboring sliding frame incident to place the respective sliding frames in operating position. The sliding frames 1 are due to their relatively great weight which they have when equipped with switching means (9 in FIG. 12), for example, with selector switches, hindered in deviating from the desired direction of motion upon withdrawal from and insertion into their assigned positions, especially when they rest on long rollers 6 presenting large rolling surfaces.

The switches and other switching means (such as 9 in FIG. 12) may be mounted on suitable transverse and longitudinal supports or upon other suitably formed and positioned supporting devices (see FIG. 12) provided in the sliding frames. Since the rear sides of the bays 2 are free, the centrally placed bays may be mutually closely positioned so as to leave only a narrow space 16 (FIG. 6) for the ribbon cables 10. The two centrally positioned bays are as already explained disposed rear to rear. With the outwardly disposed bays may be in similar manner associated further bays.

As will be seen from FIGS. 6 and 7, only two service passages 3 will be required between four bays 2. The width of the service passages 3 need only conform to the depth of the sliding frames since sliding frames 1 of only one bay 2 need be pulled out from bays 2 into the passage 3 to perform necessary services on the switching means such as 9 shown in FIG. 12.

The application of the invention to a telephone exchange installation for 10,000 subscribers' lines is shown in the schematic floor plan illustrated in FIG. 8. The switching means such as 9 in FIG. 12 are disposed in sliding frames 1 one positioned next to the other in bays indicated at 2. Four bays 2 form in the illustrated arrangement two pairs of adjacently arranged bays with the service sides thereof, denoted by arrow heads, in mutually facing position. Between each pair of bays extends a section of the peripheral passage as indicated respectively at 5*b* and 5*d*, such passage sections running longitudinal of the bay block 4 and thus coinciding with the service passages 3. A narrow space 16 is left between the right hand bay and the wall of the switch room for accommodating the cable means (not shown) for the wiring between the sliding frames 1 and the distributor for the bay connections. The bay 2 shown in FIG. 8 at the left carries on the rear side thereof a distributor 17 which is mechanically connected therewith for all the groups of switching means carried thereby, such distributor combining all the distributors shown at 7 in FIG. 6. Those of the switching means groups are advantageously combined in this bay which are respectively wired in incoming and outgoing directions. Suitable for this purpose are in a telephone installation the switching means for the various groups selection stages. An outwardly disposed service passage 3 along the rear side of the left hand bay gives access to the distributor field 17. The great length of the bays 2 permits accommodating all connecting elements belonging to the distributor field 17.

This embodiment of the installation permits favorable arrangement of parts adapted to the available space. For example, if the switch room is provided in longitudinal direction with only one row of windows 18, the equipment will be advantageously placed so that the distributor field extends along the window side 18, as is the case with the distributor field 17 on the left hand bay in FIG. 8. The arrangement moreover does not disturb the appearance of the installation by the disposition of the distributor field 17 within the area of the sections of the peripheral passage. As compared with FIG. 3, with its service passages 3 extending perpendicular to the long sides of the bay block 4, there is obtained a saving of space and favourable space utilization, that is, a great proportional share of floor space occupied by the bays, despite the provision of intermediate spaces 16 and the ample service passages 3. In an exchange of such large size, the saving as far as the length of cables and cable grates as well as wiring are concerned, gains particular importance.

FIG. 9 shows the disposition of a jumper ribbon cable 19 for interconnecting the switching means (9 in FIG. 12) of two adjacent sliding frames 1. The jumper ribbon cable 19 is a length of a ribbon cable which is carried in parallel to the conductor bundle or ribbon cable 10, extending from the sliding frame 1 to the distributor 7, to the top of the sliding frame 1 where it is folded over in perpendicular direction to the neighboring sliding frame where it is folded over again to extend in parallel with the conductor bundle or ribbon cable 10 belonging to the neighboring sliding frame. Putting it in other words, the jumper ribbon cable 19 is a length of ribbon cable which is folded upon itself in general U-shape, its legs extending in parallel with the ribbon cables 10 of the respective slide frames, upwardly and forwardly on top of these slide frames, the base of the U-shaped folded ribbon cable 19 being disposed near the frontal top edges of the two slide frames. The jumper ribbon cable 19 takes the place of an interconnection of the switching means of neighboring sliding frames by way of the distributors allotted to such sliding frames. This latter type of interconnection has the disadvantage of requiring a considerably greater number of solder points at the distributors 7.

The bays 2 shown in FIG. 10 differ from those illustrated in FIGS. 6 and 7 merely in the arrangement of the distributor (7 in FIG. 6) and distributor fields 17, respectively. The distributors are in FIG. 10 mounted upon floor-supported carriers 20 and form distributor fields 17. The cable 10 for connecting the switching means extending from distributor fields 17 to the respective sliding frames are again disposed with folds 11.

FIG. 11 indicates another bay arrangement with three bays only. Two of the bays are provided on the rear thereof with distributor fields 17 and these bays can therefore be arranged with the distributor fields facing one another and separated by a common service passage 3 which may be closed at its opposite ends by means of doors 21. The appearance of the installation is in this manner undisturbed along the peripheral passage sections 5*a* and 5*c*, by the provision of the distributor fields. The service passage 3 between the outer right hand bay and the centrally disposed bay terminates in the peripheral passage sections 5*a* and 5*c*. All the passages may be made wide enough to satisfy the safety rules.

FIGS. 12 and 13 illustrate the manner of arranging sliding frames 1 side by side to form a bay 2. The respective sliding frames accommodate the groups of switching means 9. Carriers 20 are disposed at the rear side of the bay structure to which is fastened the distributor field 17 made in accordance with the invention. The switching means groups 9 are mounted with the distributors 7 and an auxiliary distributor 22 at the distributor field 17 by way of a flexible ribbon cable 10 so that the sliding frames 1 can be moved unhindered in the direction of the arrow (FIG. 12) into the position indicated by dot-dash lines. An intermediate space will thereby be exposed between the rear side of the bay 2 and the rear side of the pulled-out sliding frames 1, which will facilitate the mounting of the bays and the extension of the wiring from the front side of the distributor field 17 to the rear thereof, at which are disposed the distributors 7 and 22. The incoming system wiring (system cable) 23 ends at terminal elements of the distributors 24. The wiring 25 (system cable) extending from a bay 2 in outgoing direction, is connected with terminal elements of the distributors 26 and the outgoing wiring 27 (system cable) which extends transverse to the longitudinal axis of the bay 2 is connected to the terminal elements constructed as a distributor 28. The outgoing wiring 25 is carried along a cable grate 8 which also supports at one end thereof the incoming wiring 23. The outgoing wiring 25 extends from the distributors 26 by way of cable grates 29 in parallel with the bottom and of the distributor field 17 to the cable grate 8. The outgoing wiring 27 extends from the distributors 28 over cable grates 30 which are likewise disposed in parallel to the bottom end of the distributor field 17 and from there to the cable grate 31 which is disposed on top of the distributor field 17. Guide elements 32 and 33 are provided respectively for the wiring between the connections 7, 24 and 22, 26. The connections 7, 22, guide elements 32, 33 and distributors 24, 26 and 28 form mutually spaced adjacent groups with the multiple wiring 35 disposed in the spaces 34 extending therebetween. The otherwise unobstructed rear side of the bay such as bay 2 is thereby utilized for the placement of the conductor bundle or ribbon cable 10 which interconnects the sliding frames as well as for the incoming bay wiring 23 and the outgoing bay wiring 25, 27, and also for accommodating the guide elements 32, 33 for the intermediate wiring, and further for accommodating the multiple wiring 35. It is in this manner for example possible to carry out the entire switching means wiring for the first, second and third group selectors of a telephone exchange installation in a single bay 2. The terminals of the distributors 7 and 22 which may have to be re-soldered and also guide elements 32, 33 are disposed at a convenient level for handling, near the central axis of the distributor field 17.

The multiple wiring 35 is short, requiring but little space in the direction perpendicular to the plane of the distributor field.

FIG. 14 shows in perspective view two bays 2, one arranged in back of the other, indicating the unitary impression made by the bays constructed and arranged according to the invention. Above the sliding frames 1 extends a sheet material framing 36 which encloses the cable grates (8 and 31 in FIG. 13) for carrying the system cables. The sliding frames 1 carry at the front thereof of indicating devices 37 belonging to supervising and control instruments associated with the switching means disposed in the respective sliding frames. The indicating devices 37 are easily accommodated on the narrow sides of the sliding frames 1 since these sides are made by members 38 formed of profile material which is in a direction perpendicularly to the plane of the sliding frames wider than the switching means 9 disposed therein and including the wiring thereof. The width 38 of the frames provides a unitary bay surface along the service side of the bay. The bay is closed at its ends by means of sheet material 12.

Changes may be made within the scope and spirit of the appended claims in which is defined what is believed to be new and desired to have protected by Letters Patent.

We claim:

1. An automatic telephone exchange installation having a plurality of switch bays, each switch bay having a plurality of sliding frames, each frame containing switching means, the shape of each frame corresponding generally to that of a long rectangle with relatively narrow edges, said frames being arranged in the respective bays in upright position side by side and individually slidable for edgewise insertion into and withdrawal from the corresponding bays, connection cable means for each bay, said bays being disposed in spaced relation to form service passages therebetween the width of which is determined by said connection cable means and to delimit a peripheral passage extending about all said bays, the number of bays being such that the length of said service passages delimited by said bays exceeds the length of the section of said peripheral passage extending perpendicularly to said service passages.

2. An installation according to claim 1, wherein two bays are disposed with those sides facing each other from which the sliding frames belonging thereto are manipulated for insertion thereinto and withdrawal therefrom.

3. An installation according to claim 1, wherein two bays are arranged one in back of the other with the rear edges of the sliding frames inserted therein facing one another across a relatively narrow space for accommodating connection cable means.

4. An installation according to claim 1, comprising distributor means individual to each sliding frame, said switching means being distributed with respect to the corresponding sliding frames of a bay so as to form groups respectively wired in incoming and outgoing directions, said groups being disposed in one bay, a common distributor field mechanically connected with said bay, and means for connecting the individual distributor means of the corresponding sliding frames with said common distributor field.

5. An installation according to claim 4, comprising ribbon cable means for interconnecting said groups of switching means with said common distributor field, said ribbon cable means having folds formed therein to permit extension thereof in the manipulation of said sliding frames incident to insertion of such frames into the bay and withdrawal thereof from the bay.

6. An installation according to claim 4, comprising a cable supporting grate, said individual distributor means being disposed on said grate on top of said sliding frames and accessible from the front side of the bay.

7. An installation according to claim 6, comprising an individual ribbon cable connected with the switching means of each slide frame and extending therefrom along the rear of the respective slide frame upwardly and forwardly along the top of such slide frame, for establishing connection with distributor means, and a device for interconnecting the ribbon cables of two adjacent slide frames, said device consisting of a length of ribbon cable which is folded upon itself to form a generally U-shaped jumper ribbon portion, the legs of such jumper ribbon portion being connected with the respective individual ribbon cables and extending upwardly and forwardly in parallel therewith to a point near the top frontal part of the corresponding slide frames, and the folded part of said jumper ribbon portion extending laterally across the top of said slide frames.

8. An installation according to claim 4, comprising carrier means extending from the floor for securing said individual distributor means.

9. An installation according to claim 8, wherein a service passage is formed between two neighboring bays for gaining access to the distributor fields thereof.

10. An installation according to claim 4, comprising carrier means forming part of the bay structure at the rear thereof for securing said common distributor field, and elements disposed in said common distributor field for effecting the wiring of the group of switching means connected thereto.

11. An installation according to claim 10, wherein said wiring elements are respectively disposed between incoming and outgoing terminal wiring means.

12. An installation according to claim 11, wherein said wiring elements are disposed in spaced apart groups forming space for accommodating the multiple wiring.

13. An installation according to claim 1, comprising roller means for each sliding frame providing floor support therefor and permitting individual manipulation thereof.

14. An installation according to claim 13, comprising a stationary floor-supported shock absorber for each sliding frame forming respectively front and rear counter stops to limit the displacement thereof.

15. An installation according to claim 14, wherein said rear counter stops are movably disposed on the respective sliding frames.

16. An installation according to claim 13, wherein said sliding frames are constructed of profiled material the width of which exceeds in corresponding direction the dimensions of the switching means and the wiring therefor.

17. An installation according to claim 16, comprising signalling elements respectively allotted to switching means disposed in each sliding frame, said signalling elements being disposed upon the respective sliding frames at places which are outwardly visible when the corresponding sliding frames are in inserted position.

References Cited in the file of this patent

UNITED STATES PATENTS

| | | |
|---|---|---|
| 1,861,224 | Neir et al. | May 31, 1932 |
| 2,656,418 | Arthur | Oct. 20, 1953 |